United States Patent
Fulton et al.

[15] 3,693,258
[45] Sept. 26, 1972

[54] INERTIA RELEASE FOR DENTAL HANDPIECE HOSE RETRACTOR

[72] Inventors: Bertram A. Fulton, Lynnfield, Mass.; Richard A. Slouka, Carpentersville, Ill.

[73] Assignee: American Hospital Supply Corporation, Evanston, Ill.

[22] Filed: May 5, 1971

[21] Appl. No.: 140,534

[52] U.S. Cl. .................................................. 32/22
[51] Int. Cl. .............................................. A61c 19/02
[58] Field of Search ............................... 32/22, 23

[56] References Cited

UNITED STATES PATENTS 3,466,749   9/1969   Nielsen ........................ 32/23

*Primary Examiner*—Antonio F. Guida
*Assistant Examiner*—J. Q. Lever, Jr.
*Attorney*—Dawson, Tilton, Fallon & Lungmus

[57] ABSTRACT

A retractor for the hose of a dental handpiece, the retractor being equipped with a spring-supported weight for tripping the release mechanism of the retractor when the hose is pulled abruptly.

8 Claims, 3 Drawing Figures

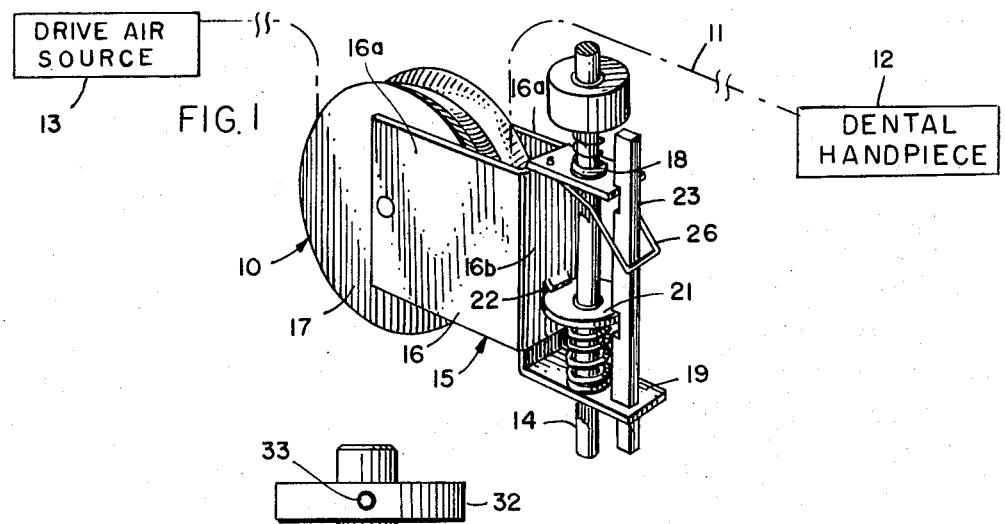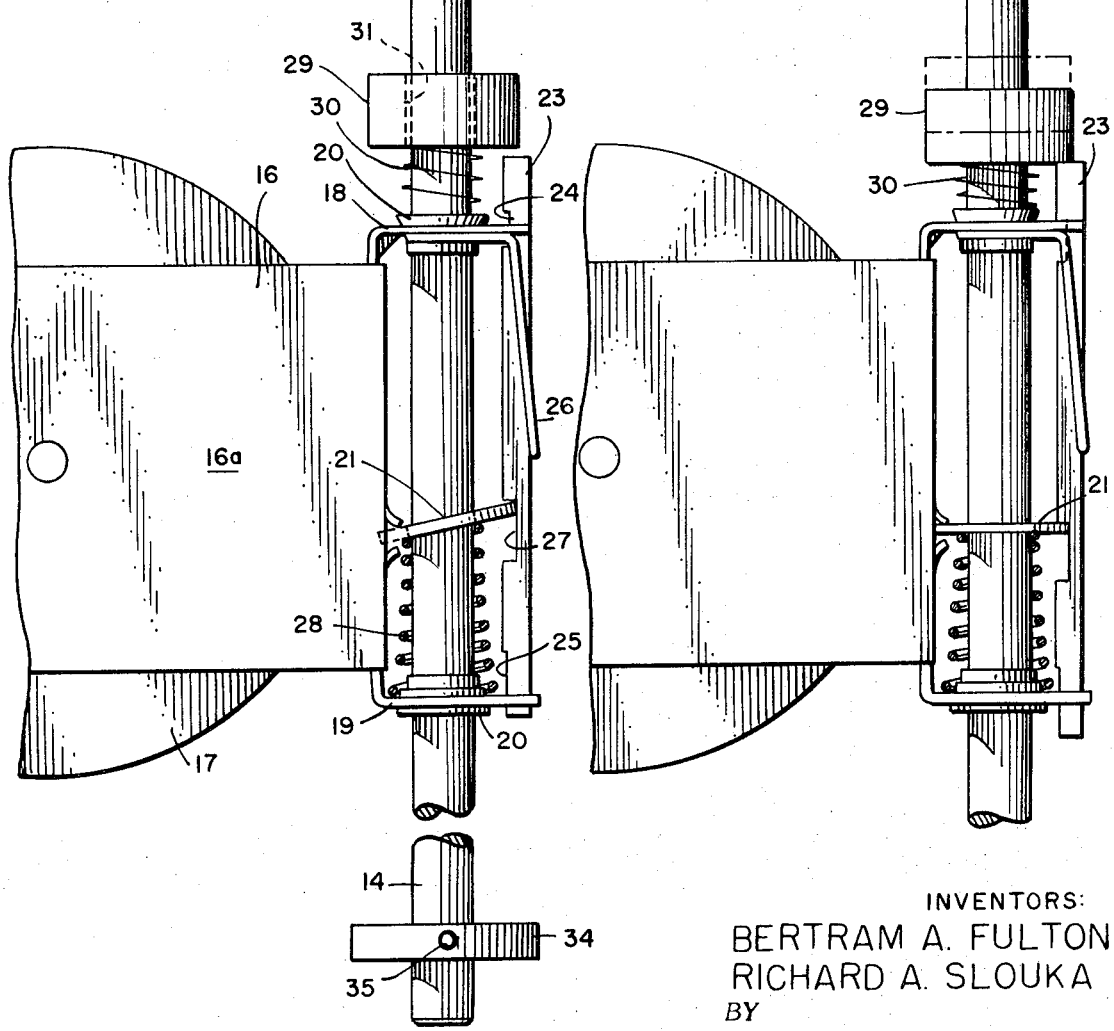

INERTIA RELEASE FOR DENTAL HANDPIECE HOSE RETRACTOR

BACKGROUND

U.S. Pat. No. 3,466,749 discloses a retractor or trolley which guides the extension and retraction of a dental handpiece hose as the handpiece is removed from and returned to the dental console or cabinet. When the dentist requires an increased length of hose, the trolley rises and more hose is played out in response to the pulling force. So that the dentist will not be encumbered by a constant retracting force exerted upon the hose (which might interfere with manipulation of the handpiece during dental work), the trolley is provided with a releasable latch. The latch is operative to prevent retraction of the hose until the dentist first extends the hose to its fullest extent, at which time the latch is automatically released and a retracting force is exerted upon the hose to return it into the console. When the hose is fully retracted, the latch is automatically reset into its operative or one-way latching condition.

SUMMARY

This invention is concerned with an improvement over the construction described above and disclosed in the aforementioned patent. While the patented construction is highly effective in operation, there are times when a dentist might prefer to actuate the hose retracting mechanism without first having to draw the hose to its full extent. For example, a dentist who varies his operating technique, working on some occasions in a standing position and at other times in a seated position, might find it inconvenient to pull the hose to its full extent in order to trip the release, especially if the particular operating technique he has completed has required only a relatively short extension of hose. On other occasions, as where the operating technique has required a substantial extension of hose, the same dentist might find that releasing the retracting mechanism in the manner disclosed in the patent is not only convenient but is preferable to any other procedure.

An object of this invention is to provide a hose retractor which not only accomplishes all of the operations and advantages of the patented construction but which also gives a dentist the option of triggering the hose retraction mechanism without requiring him to pull the hose to its full extent. Specifically, it is an object to provide a retractor which may also be activated simply by giving the hose, or the handpiece connected to it, an abrupt tug or pull.

To accomplish that objective, each trolley is provided with a spring-supported weight. When the trolley moves upwardly suddenly, in response to a tug upon the hose, the inertia of the weight momentarily overcomes the resistance of the spring and the weight trips the trigger which then releases the latching mechanism. In the absence of such abrupt pulling force, the spring maintains the weight out of contact with the control member of the trigger mechanism and no release of the latch will take place until the hose is fully extended. As the hose reaches its full extension, the weight is forced by a stop member into contact with the control member of the trigger mechanism to release the latch.

DRAWINGS

FIG. 1 is a perspective view of a hose retractor equipped with inertia release means;

FIG. 2 is an enlarged fragmentary side elevational view of the retractor with the latching element thereof in its one-way latching position;

FIG. 3 is an elevational view similar to FIG. 2 but illustrating the latching element shifted into its unlatching position by operation of the inertia release.

DESCRIPTION

Referring to the drawings, FIG. 1 illustrates a hose retractor 10 in combination with a diagrammatically illustrated hose 11, dental handpiece 12, and drive air source 13. The retractor includes a vertically extending guide rod 14 which, although shown in fragmentary form in FIG. 1, is of substantial length and would normally be mounted within the interior of a dental console. A trolley assembly 15 rides upwardly and downwardly along the guide rod with the weight of the trolley providing a retracting force upon hose 11. Thus, when a dentist is finished using handpiece 12 and wishes to return it to its appropriate receptacle in the console (not shown), the trolley assembly slides downwardly along rod 14 to retract the hose within the cabinet.

Trolley assembly 15 comprises a frame 16 having a pair of rearwardly extending arms 16a which support a vertical pulley 17 on a shaft extending between the arms. The frame also includes upper and lower arms 18 and 19 having vertically aligned apertures for slidably receiving the guide rod 14. If desired, annular bearing members 20 of nylon or Teflon, or any other suitable anti-friction material, may be fitted within the apertures of the arms 18 and 19 to reduce frictional resistance between the guide rod and trolley.

Between arms 18 and 19 is a generally horizontal latching ring or element 21 having a central aperture slightly larger than the diameter of the guide rod. The intermediate wall portion 16b of the frame is apertured at 22 to receive an edge portion of ring 21 and to retain the ring in position between the arms without preventing pivotal movement of that ring. Ring 21 is therefore capable of pivotal movement about its points of contact with the edges of opening 22 and within the range permitted by the dimensional difference between the diameter of the ring's aperture and the diameter of guide rod 14.

A vertically elongated control member or bar 23 is disposed in front of arms 18 and 19 and has vertical dimensions substantially greater than the distance between such arms. In the illustration given, the control member is provided with upper and lower notches 24 and 25. A U-shaped spring 26 has its intermediate portion extending about the front of the bar and has its ends secured to upper arm 18. The spring maintains the control bar in operative position, urging it rearwardly against the arms. The extent of vertical movement of the bar with respect to the trolley frame is determined by the length of notches 24 and 25.

A third notch 27 is provided intermediate the upper and lower ends of the control bar for receiving the front peripheral portion of the latching ring or element 21.

A helical compression spring 28 extends about the guide rod 14 between the lower arm 19 of the frame and the undersurface of the latching or locking ring 21, and exerts an upward force tending to pivot the ring into an upwardly and forwardly inclined position about the ring's pivotal connection with the frame. In the absence of an opposition to such pivotal movement imposed by control bar 23, spring 28 will pivot the ring upwardly until the edges defining its central aperture frictionally engage the surface of the guide rod 14. Under such conditions, the trolley 15 will be locked or latched against downward movement along the rod, since the weight of the trolley will cause the front and rear edges of the ring's aperture to tightly engage the surfaces of the rod, and any additional downward force exerted upon the trolley will only increase the gripping forces. However, upward movement of the trolley will not be similarly restrained because if the trolley is urged upwardly, ring 21 will automatically tend to pivot into a more nearly horizontal position, thereby relieving the frictional resistance between the ring and the guide rod.

When the control bar 23 is in a raised position, as illustrated in FIG. 2, the latching or locking ring 21 is maintained in the latching position illustrated by spring 28 to produce the one-way latching action described above. When the control bar is in its lowered position (FIGS. 1 and 3), the upper edge of intermediate notch 27 bears against the top surface of the latching ring and maintains the ring in its unlatching position substantially normal to the axis of guide rod 14. The frictional resistance between the control bar and the forwardly extending arms of the trolley frame is greater than the upward force exerted on the ring 21 by spring 28. Therefore, when the control bar is in the lowered position illustrated in FIG. 3, the trolley is free to move in either direction along the guide rod.

An inertia release member in the form of an annular weight 29 is supported upon the upper arm 18 of frame 16 by a light helical compression spring 30. The weight is slidable upon rod 14, the central aperture 30 of the annular weight being sufficiently larger than the diameter of the rod so that no appreciable frictional resistance is generated between the two parts. In the particular form of the invention depicted in the drawings, the weight is supported above the frame and is normally spaced a slight distance above the upper end of control bar or member 23.

While the spring 30 normally maintains the weight 29 in the raised position illustrated in FIG. 2, the stiffness (or lack of stiffness) of the spring and the mass of the weight are such that sudden upward acceleration of the trolley will cause the spring to deform or compress because of the inertia of the weight. Thus, with the parts in the relationships illustrated in FIG. 2, if the trolley assembly were suddenly moved upwardly along rod 14, weight 29 would tend to lag in such movement, causing compression of spring 30 and bringing the weight into forceful engagement with the upper end of control bar 23. FIG. 3 illustrates the position of the weight with the spring 30 in its fully compressed condition. It will be observed that the weight has not only engaged the upper end of control bar 23 but has shifted the bar downwardly into its lowered position, the bar in turn having pivoted the latching ring 21 into its unlatching position. After its momentary compression, spring 30 returns to its normal condition, thereby elevating the weight into the position illustrated in phantom in FIG. 3.

It is believed apparent from the foregoing that when a dentist grips handpiece 12 and extends the hose 11 connected thereto, trolley assembly 15 will move upwardly along guide rod 14 until the desired length of hose has played out. Such upward movement of the trolley assembly must occur as the hose is being extended because the opposite end of the hose is fixed to a stationary drive air source 13 within the dental cabinet or console. When a selected length of hose has been played out, the automatic one-way latching action of element 21 maintains that selected length; that is, the trolley will automatically latch against downward movement and no retraction force will be exerted upon the hose. Thereafter, when retraction of the hose is desired, the dentist simply exerts an abrupt pulling force upon the hose to lift the trolley assembly, cause compression of spring 30, and shift the ring 21 into the unlatching position of FIGS. 1 and 3.

Unlatching of the trolley may also be achieved by drawing out the hose to its full extent, causing the upper surface of weight 31 to engage an upper stop member 32. The stop member is in the form of an apertured disk which is slidably mounted at the upper end of the guide rod 14 and which is secured in any desired axial position by simply tightening locking screw 33 against the rod's outer surface. Forceful contact with stop member 32 has the same effect upon weight 29 and spring 30 as rapid upward acceleration of the trolley—in both cases, the spring is compressed, the weight moves downwardly relative to the trolley frame, the control member 23 is engaged and urged by the weight into its lowered position, and the latching element or ring 21 is shifted into its unlatching position (FIG. 3).

A lower stop member 34, similar to member 32, is positioned at the lower end of guide rod 14. Like the upper stop member, the lower stop member is adjustable in its position by reason of an adjustment screw 35. The lower stop is positioned along guide rod 14 so that when hose 11 is fully retracted, the lower end of control bar or member 23 will be in engagement with the stop 34 and will have been shifted into its raised position to cock the ring 21 into the latching position illustrated in FIG. 2.

While in the foregoing we have disclosed an embodiment of the invention in considerable detail for purposes of illustration, it will be understood by those skilled in the art that many of these details may be varied without departing from the spirit and scope of the invention.

We claim:

1. A retractor for dental handpiece hose comprising a substantially vertical guide rod adapted to be mounted within a dental console, a trolley assembly comprising a vertically-extending pulley carried by a frame, said frame being slidable vertically along said rod and being equipped with a releasable latching element engagable with said rod, said element being mounted for movement between a latching position wherein downward movement of said assembly is restrained and an unlatching position wherein said assembly is freely movable both upwardly and downwardly along said rod, and means operatively cooperating with said latching element for moving the same from its latching position to its unlatching position when said assembly is moved suddenly upwardly along said rod, said means including a weight and a spring supporting said weight and interposed between said weight and said frame, said spring being vertically deformable by the inertia of said weight, and said weight being moved from a raised position into a lowered position relative to said frame, when said assembly is moved suddenly upwardly, and a member operatively conneting said weight and said latching element for shifting said element into its latching position when said weight moves into its lowered position.

2. The structure of claim 1 in which said last-mentioned means comprises a control member movably mounted upon said frame and engageable with both said weight and said latching element.

3. The structure of claim 1 in which said weight is disposed above said frame and said spring is a compression spring.

4. A retractor for dental handpiece hose comprising a substantially vertical guide rod adapted to be mounted within a dental console, a trolley assembly comprising a vertically extending pulley carried by a frame, said frame being slidable vertically along said rod and being equipped with a releasable latching element engageable with said rod, said element being mounted for movement between a latching position wherein downward movement of said assembly is restrained and an unlatching position wherein said assembly is freely movable both upwardly and downwardly along said rod, a control member operatively cooperating with said latching element for shifting said element between its latching and unlatching positions, said control member being movable between raised and lowered positions relative to said frame and being operative to shift said element into its unlatching position when said member is moved into its lowered position, a weight, and a spring mounted upon said frame supporting said weight above said control member, said spring being distortable under the inertia of said weight, and said weight being forceably engagable with said control member to urge the same into its lowered position, when said frame is moved suddenly upwardly along said rod.

5. The structure of claim 4 in which said guide rod is provided with an upper stop member, said upper stop member being engagable with said weight to urge said weight into engagement with said control member and to shift said control member into its lowered position when said assembly approaches the upper end of said rod.

6. The structure of claim 5 in which said upper stop member is adjustable into selected positions of adjustment along said rod.

7. The structure of claim 4 in which said spring is a helical compression spring.

8. The structure of claim 4 in which said guide rod is provided with upper and lower stops, said lower stop being engagable with said control member to urge the same into its raised position when said assembly approaches the lower end of said rod and said upper stop being engagable with said weight to urge said weight into engagement with said member and to shift said member into its lowered position when said assembly approaches the upper end of said rod.

* * * * *